Dec. 31, 1968        D. I. G. JONES ET AL        3,419,111
            PLURAL LOAD VISCOELASTIC DAMPING DEVICE
Filed Oct. 24, 1966

INVENTORS
DAVID I. G. JONES
JOHN P. HENDERSON
BY Harry A. Herbert Jr.
ATTORNEY

Richard J. Killoren
AGENT

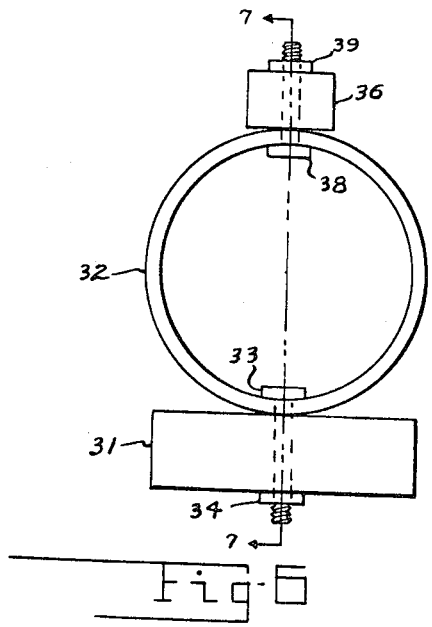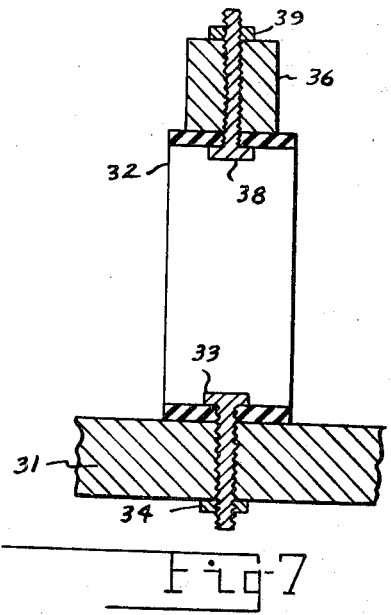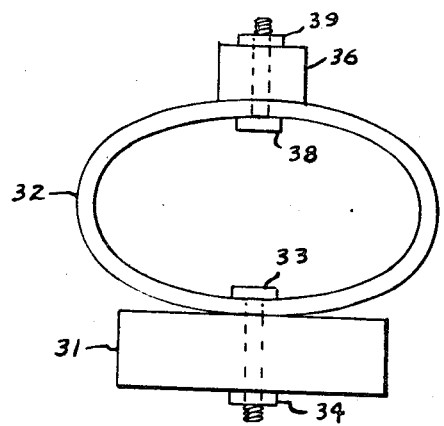

United States Patent Office 3,419,111
Patented Dec. 31, 1968

3,419,111
PLURAL LOAD VISCOELASTIC
DAMPING DEVICE
David I. G. Jones, Dayton, and John P. Henderson, Fairborn, Ohio, assignors to the United States of America as represented by the Secretary of the Air Force
Filed Oct. 24, 1966, Ser. No. 589,141
2 Claims. (Cl. 188—1)

ABSTRACT OF THE DISCLOSURE

To dissipate energy in a structure, which vibrates in a plurality of modes, an inertial mass is connected to the vibrating structure by means of a viscoelastic material.

The invention described herein may be manufactured and used by or for the United States Government for governmental purposes without the payment to us of any royalty thereon.

This invention relates to viscoelastic vibration energy dissipators.

One object of the invention is to provide viscoelastic energy dissipating devices which provide absorption of both longitudinal and rotational vibrations of mechanical devices.

A further object of the invention is to provide a very compact configuration of a viscoelastic energy dissipating device which provides absorption in various modes of vibration.

These and other objects will be more fully understood from the following detailed description taken with the drawing, wherein:

FIG. 6 is an end view of an energy dissipating device according to a further embodiment of the invention;

FIG. 7 is a sectional view of the device of FIG. 6 along the line 7—7; and

FIG. 8 is an end view of the device of FIG. 6 in one of its possible strained conditions.

Damped dynamic absorbers or vibration dampers have been studied by numerous investigators throughout the years. Recent investigations have refined these analysis by introducing other ways of mathematically representing damping in a dynamic absorber that utilizes a spring made from rubber-like or viscoelastic materials which both store and dissipate energy. These investigations have generally concerned themselves with constructing dampers tuned to damp a single troublesome resonance in the vibrating structure.

However, a study of the literature shows that no consideration has apparently been given to the contrivance of specific resonant devices for use in aerospace vehicle structures in which damping is required in several modes of vibration that occur over a relatively wide band of frequencies.

According to the invention, an energy dissipating device is provided which will provide damping in more than one mode of vibration.

Figure 1:
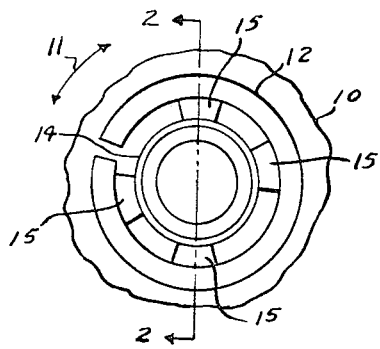
FIG. 1 is an end view of an energy dissipating device according to one embodiment of the invention.
Figure 2:
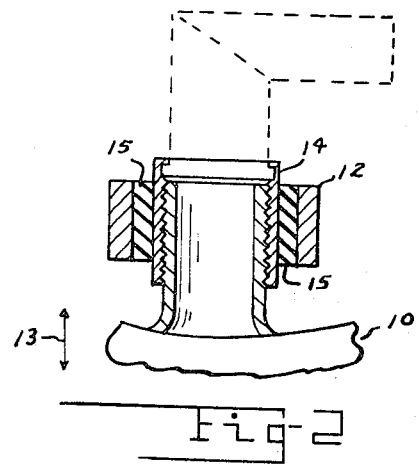
FIG. 2 is a sectional view of the device of FIG. 1 along the line 2—2.
Figure 3:
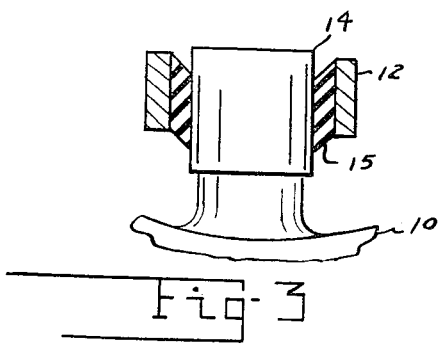
FIG. 3 shows the device of FIGS. 1 and 2 in its axial strained condition.
Figure 4:
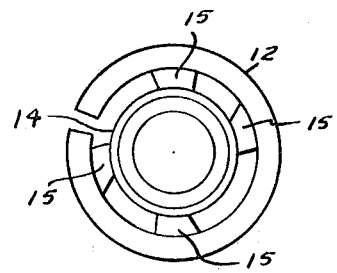
FIG. 4 shows the device of FIGS. 1 and 2 in its rotational strained condition.

Reference is now made to FIG. 1 of the drawing which shows a vibrating structure 10 capable of having angular vibrations 11 as shown in FIG. 1, or longitudinal vibrations 13 as shown in FIG. 2. A substantially annular mass 12 is secured to coupling member 14 by means of a plurality of viscoelastic members 15 spaced around the periphery of coupling member 14. The viscoelastic material is secured to the mass 12 and the coupling member 14 with an adhesive.

Figure 5:
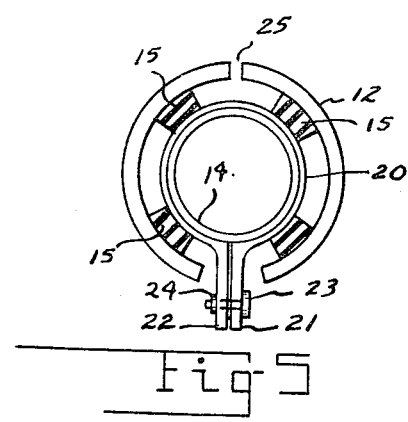
FIG. 5 is an end view of an energy dissipating device according to another embodiment of the invention.

If it is impossible or undesirable to attach the viscoelastic material to a member such as coupling member 14, or if it is desirable to adjust the position of the damping device, the device may be modified as shown in FIG. 5 wherein the viscoelastic elements 15 are secured to a split ring clamp member 20 which is then secured to the member to be damped by means of a pair of flanges 21 and 22 and a bolt 23 and nut 24. A slot 25 is used to prevent undue straining of the viscoelastic elements 15 during attachment.

A configuration which will provide damping in many vibrating modes and which is readily attachable and removable is shown in FIGS. 6–8. In this device, a vibrating structure 31 has a cylindrical viscoelastic member 32 secured thereto by means of bolt 33 and nut 34. A mass 36 is attached to the member 32 by means of bolt 38 and nut 39. The position of attachment of the mass 36 is diametrically opposite the attachment to the vibrating structure 31. With this structure, the various size masses may be readily attached to the viscoelastic member 32. Also, the viscoelastic member may have other shapes than that shown, for example, it could be made spherical. When permanent structures are to be used, 33, 34, 38 and 39 may be replaced by adhesives.

There is thus provided a viscoelastic vibration energy dissipation device which provides absorption in various modes of vibration.

While certain specific embodiments have been described, it is obvious that numerous changes may be made without departing from the general principles and scope of the invention.

We claim:

1. A device for dissipating the energy in a vibrating structure comprising: a tubular viscoelastic member; means for providing a single point of attachment between said viscoelastic member and said vibrating structure; an inertial mass member; means, connecting said inertial mass to said tubular viscoelastic member at a point diametrically opposite the point of attachment of the vibrating structure, for absorbing a plurality of modes of vibration in said vibrating structure.

2. The device as recited in claim 1 wherein said inertial mass member is releasably attached to said viscoelastic means whereby inertial members with different mass may be supported on said viscoelastic means.

References Cited

UNITED STATES PATENTS

| 1,638,782 | 8/1927  | Paton      | 188—1 X |
| 1,657,390 | 1/1928  | Halikman   | 188—1   |
| 2,857,974 | 10/1958 | Heller     | 188—1 X |
| 3,334,886 | 8/1967  | Caunt      | 188—1 X |
| 3,078,971 | 2/1963  | Wallerstein| 188—1 X |
| 3,262,521 | 7/1966  | Warnaka    | 188—1   |
| 3,314,502 | 4/1967  | Thorn      | 188—1   |
| 3,321,569 | 5/1967  | Taylor     | 188—1 X |

DUANE A. REGER, *Primary Examiner.*